(12) United States Patent
Vinte

(10) Patent No.: US 8,255,321 B2
(45) Date of Patent: Aug. 28, 2012

(54) METHODS AND APPARATUS FOR OPTIMIZING THE DISTRIBUTION OF TRADING EXECUTIONS

(75) Inventor: Claudiu Vinte, Tokyo (JP)

(73) Assignee: Goldman, Sachs & Co., New York, NY (US)

(*) Notice: Subject to any disclaimer, the term of this patent is extended or adjusted under 35 U.S.C. 154(b) by 143 days.

(21) Appl. No.: 11/394,854

(22) Filed: Mar. 30, 2006

(65) Prior Publication Data

US 2006/0224495 A1  Oct. 5, 2006

Related U.S. Application Data

(60) Provisional application No. 60/667,474, filed on Apr. 1, 2005.

(51) Int. Cl.
*G06Q 40/00* (2012.01)

(52) U.S. Cl. ............... 705/39; 705/8; 705/36 R; 705/37; 703/2

(58) Field of Classification Search ............... 705/37, 705/8, 36 R; 703/2
See application file for complete search history.

(56) References Cited

U.S. PATENT DOCUMENTS

| | | | |
|---|---|---|---|
| 6,321,212 B1* | 11/2001 | Lange | 705/36 R |
| 6,850,907 B2* | 2/2005 | Lutnick et al. | 705/37 |
| 7,024,387 B1* | 4/2006 | Nieboer et al. | 705/37 |
| 2003/0055614 A1* | 3/2003 | Pelikan et al. | 703/2 |
| 2003/0115090 A1* | 6/2003 | Mujtaba et al. | 705/8 |
| 2003/0236738 A1* | 12/2003 | Lange et al. | 705/37 |
| 2006/0069635 A1* | 3/2006 | Ram et al. | 705/37 |

\* cited by examiner

*Primary Examiner* — James P Trammell
*Assistant Examiner* — Sanjeev Malhotra
(74) *Attorney, Agent, or Firm* — Perkins Coie LLP

(57) ABSTRACT

The present invention relates to electronic trading of securities. In some embodiments, the present invention relates to methods and apparatus for optimizing the distribution of trading executions in an investor's accounts. Pursuant to some embodiments, an integer allocation algorithm is provided.

10 Claims, 4 Drawing Sheets

US 8,255,321 B2

METHODS AND APPARATUS FOR OPTIMIZING THE DISTRIBUTION OF TRADING EXECUTIONS

RELATED APPLICATIONS

This application claims priority to and benefit of U.S. Provisional Patent Application Ser. No. 60/667,474, filed on Apr. 1, 2005, the contents of which are hereby incorporated herein for all purposes.

FIELD

The present invention relates to electronic trading of securities.

BACKGROUND

A primary function of brokerage firms is to conduct trades on behalf of clients. From an information flow perspective, trading at a brokerage firm includes steps of collecting orders from clients to buy or sell various financial products and placing these orders on a specified stock exchange. Each client may have multiple brokerage accounts open at a brokerage firm so the trading must specify which account a trade is associated with. Once an order is placed, it may be executed (e.g., by the selected stock exchange's matching engine). The executions are captured by the brokerage firm's trading system and the executed quantities from each financial product must be allocated fairly on the client's accounts. That is, they must be allocated based on the ordered quantity per account (as specified by the client at the time of placing the order).

Some orders may be fully executed, while others may be partially executed or not executed at all. If the entire ordered quantity it is executed (fully or partially) at a unique price, then allocation is straightforward—the executed quantity will be allocated on the client's accounts proportionate to the quantity demanded by the client in each of its accounts.

However, often there is a price breakdown associated with an order. That is, the total ordered quantity is fully or partially executed at multiple prices. Such situations give rise to an integer allocation problem that requires optimization. Pursuant to some embodiments, an optimization algorithm is provided to achieve an average price per account as close as possible to each other (and to the overall weighted average price), with respect to the initial demanded quantity per account.

The problem is exacerbated because, in general, no satisfactory polynomial algorithm has been discovered that can be used in integer linear programming. Generally, the practical experience shows that large-scale integer linear programs seem as yet practically unsolvable or extremely time-consuming. The algorithm and embodiments described herein provide an alternative approach to the problem and provide desirable results.

DESCRIPTION

Figure 1:
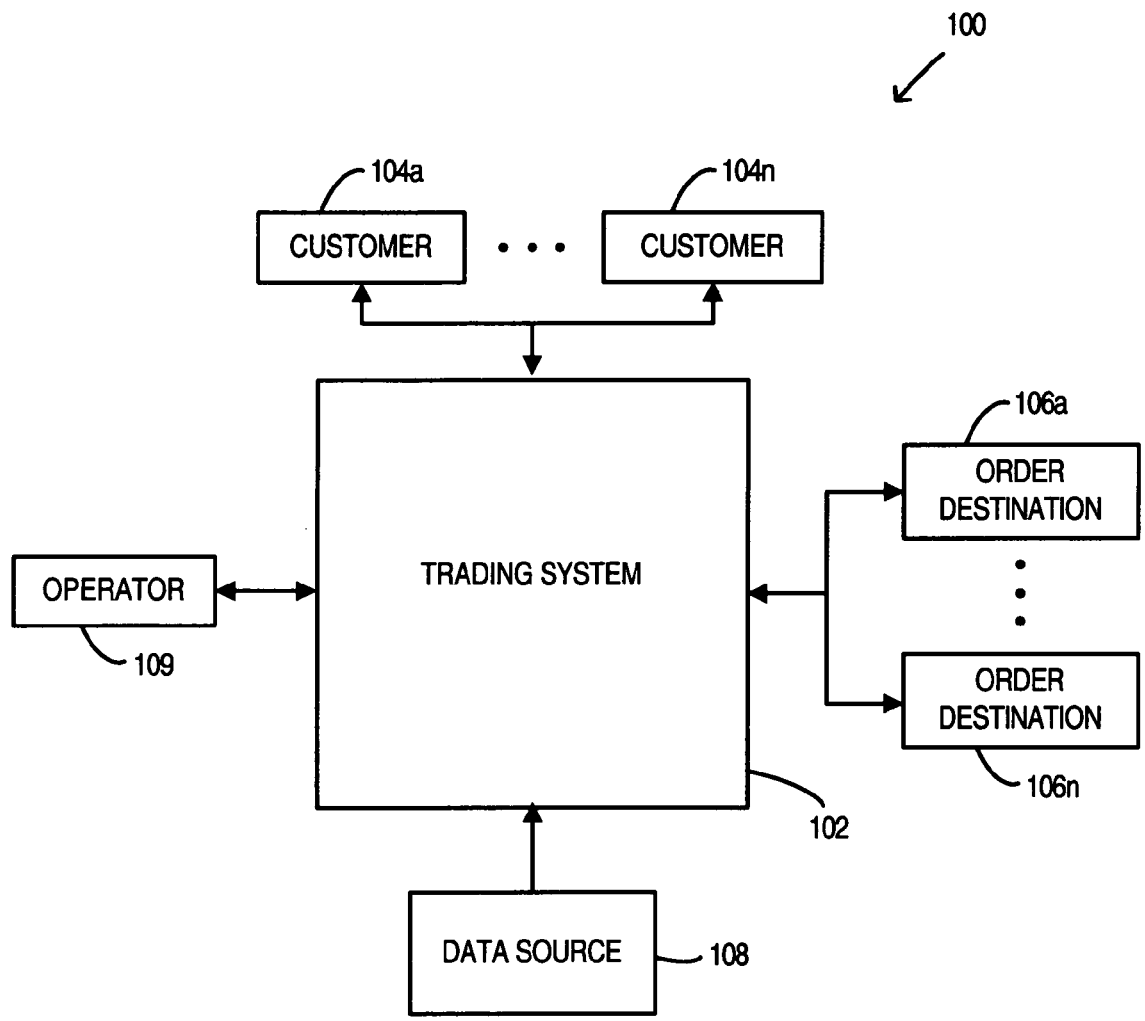
FIG. 1 is a block diagram of a system consistent with the present invention.

Applicant has recognized that there is a need for an improved system, method, apparatus, computer program code, and means for allocating an executed order among a plurality of customer accounts. In some embodiments, the present invention relates to methods and apparatus for optimizing the distribution of trading executions in investor accounts. Pursuant to some embodiments, an integer allocation algorithm is provided.

For the purposes of describing features of embodiments of the present invention, a number of terms are used herein. For example, the terms "client", "customer" or "investor" are generally used interchangeably to refer to an individual or entity that has provided instructions to execute a trade on its behalf.

As used herein, the term "optimization algorithm" is used to refer to a numerical method or algorithm for finding a value x such that $f(x)$ is as small (or as large) as possible, for a given function $f$, possibly with some constraints on x. As used herein, the term "Tabu search" refers to a mathematical optimization method that generally enhances the performance of a local search method by using memory structures.

As used herein, the term "simulated annealing" is used to refer to a global optimization technique which traverses the search space by generating neighbouring solutions of the current solution.

In general, and for the purposes of introducing concepts of embodiments of the present invention, customer orders are allocated among customer accounts pursuant to embodiments of the present invention as follows. A customer who has multiple accounts at a brokerage firm places a trade order. When the trade order is executed, the executed quantities are fairly allocated on the customer's accounts pursuant to allocation instructions provided by the customer. In situations where the total ordered quantity is partially executed at multiple prices, an allocation problem arises. Embodiments of the present invention address the allocation problem by first determining the quantity of the orders that are to be allocated to each account. In some embodiments, this is done on a pro-rata basis.

Embodiments then arrange execution price data associated with the executed orders into separate lists or subsets. In one embodiment, price data is sorted into two lists or subsets, although those skilled in the art will appreciate that different numbers (so long as there are at least two) may be used. Once the price data has been sorted into lists or subsets so that the executed prices are distributed across the subsets, the solution is improved iteratively so that the executed prices are sorted in the best fashion possible. In this manner, embodiments efficiently and accurately allocate executed prices across different accounts. Further, embodiments allow this efficient and accurate allocation to be done programmatically; something that prior approaches were unable to do effectively because there is generally no polynomial algorithm for such integer linear programming problems.

Pursuant to some embodiments, a system, method, means, and computer program code for generating an initial optimization are provided which include distributing two lists of executed prices, including a first list of executed prices under an overall weight price, and a second list of executed prices above the overall weight price, and distributing the prices over the customers accounts such that at each iteration the executed prices that is the closest distance between the average price of a given account and the overall average is selected.

Features of some embodiments of the present invention will now be described by first referring to FIG. 1 where a block diagram of one embodiment of a trading network 100 is shown. As shown, trading network 100 includes a number of different components which cooperatively operate to process, route and execute securities trading orders pursuant to some embodiments of the present invention. In general, features of some embodiments may be implemented in a trading environment such as the trading environment shown in FIG. 1. For example, features of some embodiments may be used to allocate executed orders across a number of accounts held by a customer such as customer 104a.

As depicted, trading network 100 includes a trading system 102 in communication with one or more customer(s) 104, a plurality of order destinations 106, a source 108 of order destination data, and one or more operator devices 109 (only one shown). Trading system 102, in some embodiments, includes additional components (not shown), such as an execution core, order routing functions, storage capabilities, etc. The execution core may be any trading execution software, systems and/or devices which are configured to receive customer orders and process them to execute orders on behalf of customers. In some embodiments, the execution core may function to timestamp orders when received and to assign an order identifier or sequence number to each order.

Some routing software or functionality may also be provided to receive an order from the execution core or to receive information about an order and to make a determination as to how the order is to be routed. Code, rules, or other components may be provided to implement the optimization and other algorithms described above to distribute trading executions in customer accounts. Pursuant to some embodiments, trading system 102 includes, or has access to, a plurality of trading accounts associated with customers 104.

Although a single trading system 102 is shown in FIG. 1, any number of trading systems may be included in trading network 100. Similarly, any number of data sources 108, customer devices 104, order destinations 106, operator devices or any other device described herein may be included in the trading network 100 according to embodiments of the present invention.

Each of the devices of trading network 100 may be formed of components or other devices capable of performing the various functions described herein. For example, a customer device 104 may be a computing device such as a Personal Computer (PC), a laptop, a telephone, or other device associated with a customer. As used herein, the term "customer" may refer to, for example, an individual or other entity that buys and sells securities (and pursuant to some embodiments of the present invention, options; for purposes of this disclosure and the appended claims "securities" will be understood to include options). For example, a customer operating a customer device may be a broker or other entity desiring to purchase or sell securities using features of embodiments of the present invention. The broker or other entity may be operating on behalf of the ultimate purchaser or seller of the securities.

An order destination 106 may include any computing device(s) operated by or on behalf of one or more order destinations. Each of the order destinations may be in communication with other devices described herein, such as the data source 108, using techniques known in the art. In general, the data source 108 may receive information from the order destinations 106 upon the occasion of each order received by the order destinations and/or after the completion of each trading transaction. Each order destination 106 may include one or more operator terminals allowing specialists or traders at the order destination to respond to orders received and to complete execution of an order pursuant to its terms.

Operator device 109 may, for example, be constituted by a computer terminal or by a computing device such as a PC or a laptop in communication with the trading system 102.

As used herein, devices (e.g., trading system 102, operator device 109, order destinations 106, customer devices 104 and data sources 108) may communicate, for example, via one or more communication networks. For example, some or all of the devices may be in communication via an Internet Protocol (IP) network such as the Internet. Some or all of the devices may be in communication via other types of networks such as an intranet, a Local Area Network (LAN), a Metropolitan Area Network (MAN), a Wide Area Network (WAN), a proprietary network, a Public Switched Telephone Network (PSTN), and/or a wireless network.

According to some embodiments of the present invention, communication between some or all of the devices of trading network 100 may be via temporary computer communication channel (e.g., a logic path through which information can be exchanged). In other words, the communication channel between various devices may be established and discontinued as appropriate. For example, trading system 102 may exchange information with one of the order destinations 106 only when communication is necessary to transmit an order for execution by the order destination 106 or to receive confirmation from the order destination 106 that the order was executed.

According to some embodiments, some or all of the devices may communicate with other devices via a public computer communication network. That is, at least a portion of the communication network may be accessed by devices other than the devices depicted in FIG. 1. Note, however, that the information exchanged between trading system 102 and other devices in FIG. 1 may be encrypted or otherwise protected to prevent a third party from accessing, manipulating, understanding and/or misusing the information. In some embodiments, some or all of the devices may communicate over a private network.

In other embodiments, the devices of FIG. 1 are connected differently than as shown. For example, some or all of the devices may be connected indirectly to one another (e.g., via the Internet). Of course, embodiments of the invention may include devices that are different from those shown. It should also be noted that although the devices are shown in communication with each other, the devices need not be constantly exchanging data. Rather, communication may be established when necessary and severed at other times or always available but rarely used to transmit data. Moreover, although the illustrated communication links appear dedicated, it should be noted that each of the links may be shared by other devices. Features of some embodiments may be used to allocate executed orders across a number of accounts held by a customer such as customer 104a.

Figure 2:
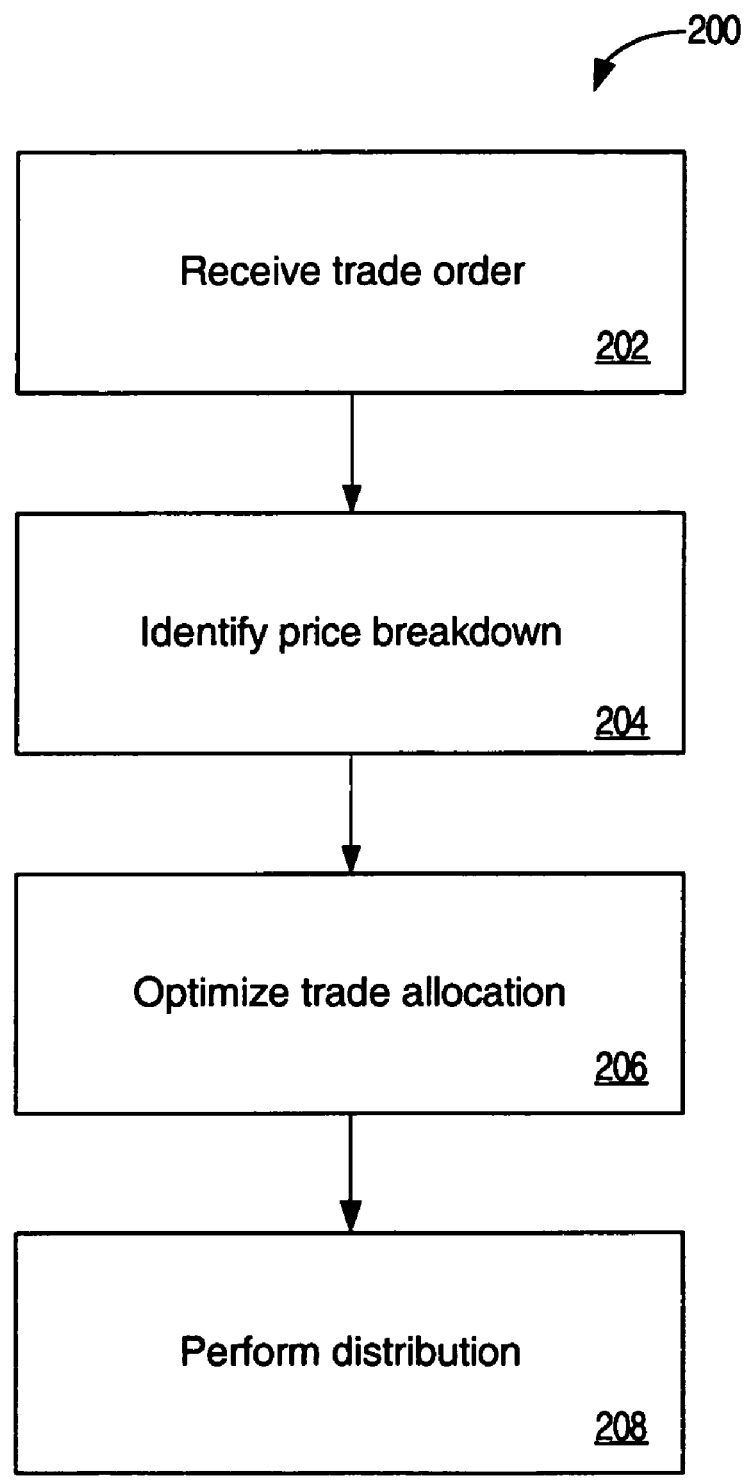
FIG. 2 is a flow diagram consistent with some embodiments.

In some embodiments, the allocation is performed programmatically using, for example, a computing device associated with or in communication with trading system 102. The allocation may be performed on a real-time basis (e.g., upon completion of a trade requiring allocation), or on a batch or daily basis. Further details of such a computing device will be provided below in conjunction with a description of FIG. 4. First, however, reference is made to FIG. 2 where a process 200 is shown for trade processing. The flow chart in FIG. 2 and the flow charts in other figures described herein do not imply a fixed order to the steps, and embodiments of the present invention can be practiced in any order that is practicable. Some or all of the steps of the process shown in FIG. 2 may be performed, for example, by a trading system such as the trading system 102 of FIG. 1. In some embodiments, some of the steps of the process are performed by an allocation system such as the system 400 of FIG. 4.

Process 200 begins at 202 where a trade order is received. For example, the trade order may be received at trading system 102 in any of a number ways commonly known in the art. The trade order may be received from a customer having a number of accounts at, for example, a brokerage. The customer may also provide allocation instructions associated with the execution of the order. For example, if the customer has four accounts, the customer may indicate that the executed quantities be allocated in a certain way across those four accounts.

Processing continues at 204 where price breakdowns associated with the trade order are identified. Price breakdowns are identified, for example, during or after the execution (or attempted execution) of an order. As discussed above, price breakdown occurs when the total ordered quantity is fully or partially executed at multiple prices. Pursuant to some embodiments, this price breakdown may be identified by the trading system (such as trading system 102) or after processing by a system such as the allocation system 400 of FIG. 4.

Processing continues at 206 where features of embodiments of the present invention are used to optimize trade allocation associated with the order. In general, embodiments utilize a multi-step process that includes an iterative improvement to a distribution. Further details of the multi-step process will be provided below in conjunction with FIG. 3.

Once the trade allocation among the various accounts has been optimized, processing continues to 208 where the distribution is performed. For example, the distribution may be performed by a trading system such as the trading system 102 of FIG. 1. The distribution may also be performed by a brokerage computing system or some other system or device. The end result is an efficient and accurate allocation and distribution of executed orders among various accounts.

Trade allocation processing pursuant to embodiments of the present invention will be described in conjunction with FIG. 3. Prior to a discussion of FIG. 3, a brief introduction to the algorithms and nomenclature will first be provided. As discussed above, in general, there is no polynomial algorithm that is satisfactory for integer linear programming (e.g., a problem which is NP-complete). In general, the existing large-scale integer linear programs are practically unsolvable or extremely time-consuming. The algorithm described for use in conjunction with embodiments herein provides an alternative approach to the problem.

Given a set of n accounts that an investor or customer may have open with a brokerage firm, the following discussion provides an introductory description of the manner in which the investor wants to distribute the total quantity of an order placed for a certain financial product on the accounts opened with the brokerage. Formula (1) describes the order (where Q is the total ordered quantity), and the accounts and allocation is shown by Formula (2) (also referred to as the breakdown scheme or allocation instructions).

$$Q = \sum_{i=1}^{n} q_j, \qquad (1)$$

$$\begin{bmatrix} A_1 & A_2 & A_3 & \cdots & A_n \\ q_1 & q_2 & q_3 & \cdots & q_n \end{bmatrix}, \qquad (2)$$

On the market or exchange, the total ordered quantity may be executed in multiple portions (tranches or blocks) at different prices as show in Formula (3):

$$\begin{bmatrix} (p_1, e_1) \\ (p_2, e_2) \\ (p_3, e_3) \\ \vdots \\ (p_m, e_m) \end{bmatrix}, \text{ where } (p_i, e_i), i = \overline{1, m} \qquad (3)$$

The pairs $(p_i, e_i)$ are the pair of the executed quantity $(e_i)$ and the executed price $(p_i)$ and where m is the number of executions received from the market for the corresponding order. The following condition, shown as Formula (4), is in place:

$$0 \leq \sum_{i=1}^{m} e_i = E \leq Q = \sum_{j=1}^{n} q_j \qquad (4)$$

where E is the total executed quantity. That is, as described above, an order may be fully executed, partially executed or not executed at all. Pursuant to some embodiments, a solution is provided for the integer allocation problem of finding the appropriate distribution D of the executed quantities in the investors' accounts, based on the investor's allocation instructions. The solution provides—for each account—the closest average price to the overall average. Put another way, the solution minimizes the function shown in Formula (5):

$$o = \sum_{j=1}^{n} |(\overline{p} - \overline{p_j})|, \qquad (5)$$

Where $|(\overline{p} - \overline{p_j})|$ is the absolute value of Formula (6):

$$(\overline{p} - \overline{p_j}), \overline{p_j} = \frac{\sum_{i=1}^{m}(p_i \times a_{ij})}{\sum_{i=1}^{m} a_{ij}} \qquad (6)$$

and is the average price per account, and $$\overline{p} = \frac{\sum_{i=1}^{m}(p_i \times e_i)}{\sum_{i=1}^{m} e_i} \qquad (7)$$

l is the overall (weighted) average price, as shown in Formula (8), below:

$$\begin{bmatrix} & A_1 & A_2 & \cdots & A_n \\ (p_1, e1) & a_{11} & a_{12} & \cdots & a_{1n} \\ (p_2, e_2) & & & & \\ \vdots & D = a_{21} & a_{22} & \cdots & a_{2n} \\ & \vdots & \vdots & \vdots & \vdots \\ (p_m, e_m) & & & & \\ & a_{m1} & a_{m2} & \cdots & a_{mn} \\ \overline{p} & \overline{p_1} & \overline{p_2} & \cdots & \overline{p_n} \end{bmatrix} \quad (8)$$

Figure 3:
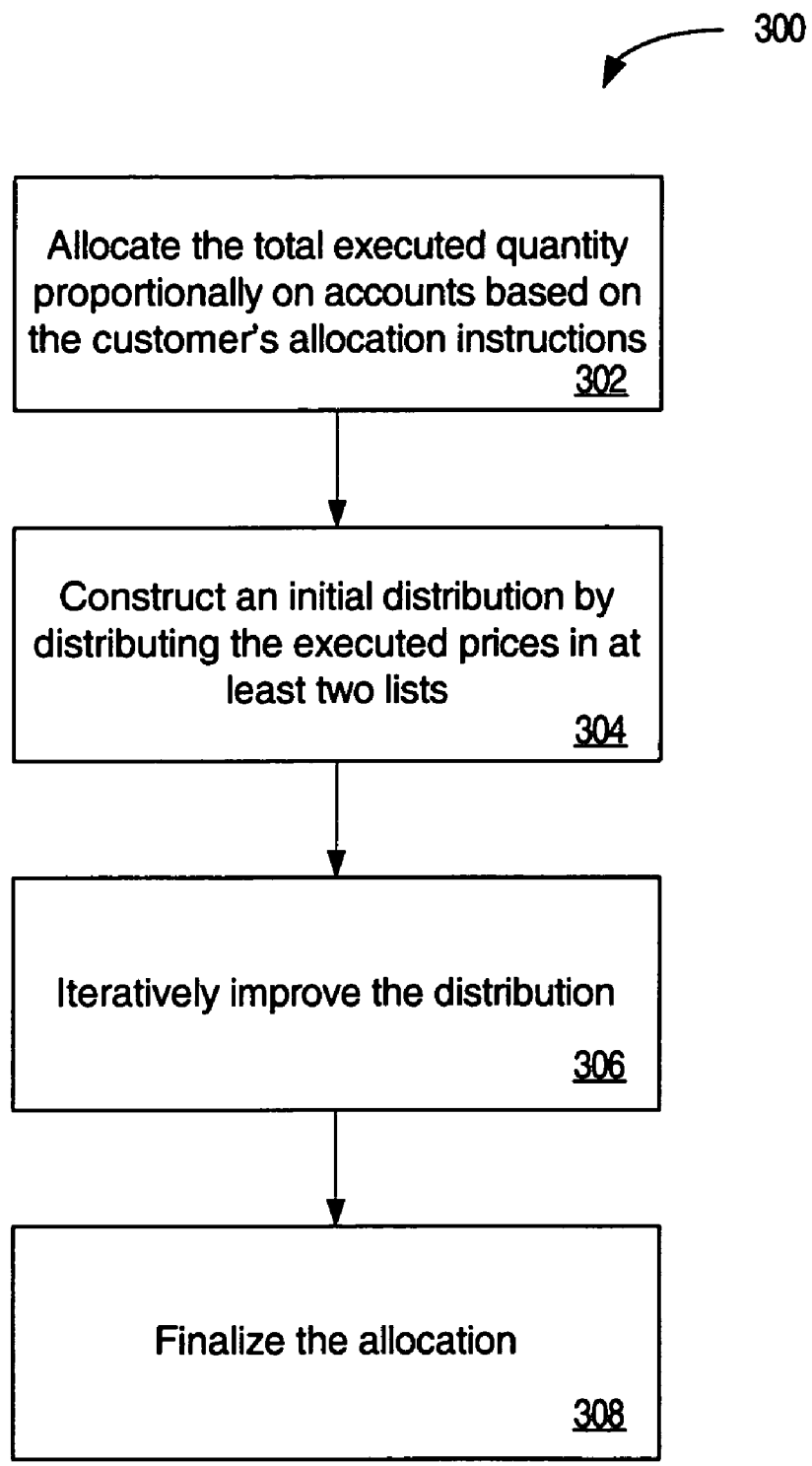
FIG. 3 is a flow diagram consistent with some embodiments.

With this background and context, reference is now made to FIG. 3 where a process 300 is shown for trade allocation processing. Some or all of the steps of the process shown in FIG. 3 may be performed, for example, by, a system such as the allocation system 400 of FIG. 4. In some embodiments, some or all of the steps of the process may be performed by a trading system such as the trading system 102 of FIG. 1.

Allocation processing may begin once a price breakdown has been associated with an order (e.g., in real time, or in a batch process at the end of day). Allocation processing begins at 302 where the total executed quantity of a trade order is allocated proportionally on accounts based on the customer's allocation instructions. For example, the total executed quantity is allocated proportionally on the customer's accounts on a pro-rata basis. In one embodiment, processing at 302 includes determining a pro-rata coefficient for each customer account. Formula (9) illustrates one embodiment of such a determination.

$$0 \leq c_j = \frac{q_j}{\sum_{j=1}^{n} q_j} \leq 1, j = \overline{1, n}. \quad (9)$$

In this illustrative embodiment, the coefficients represent the proportional number of executed orders or lots that have to be allocated per account from each execution, according to the customer's allocation instructions.

Once this coefficient has been determined, processing continues where a calculation is performed to identify the percentage the demanded quantity has been satisfied for each account. Formula (10) illustrates one embodiment of this calculation (where $\langle c_j \rangle$ is the integer part of $c_j$ (truncation)):

$$f_j = \frac{(q_j - \langle c_j \rangle)}{q_j} \times 100, j = \overline{1, n} \quad (10)$$

The remaining or residual quantity per account is then shown by Formula (11):

$$r_j = q_j - \langle c_j \rangle, j = \overline{1, n}. \quad (11)$$

And the total remaining quantity to be allocated is expressed by Formula (12):

$$R = \sum_{i=1}^{n} (q_j - \langle c_j \rangle) = \sum_{i=1}^{n} r_j. \quad (12)$$

In addition, each account may be assigned a certain priority $t_j$ $j=\overline{1,n}$.

The tableau shown as Formula (13) describes the above-mentioned correspondences:

$$\begin{bmatrix} A_1 & A_2 & A_3 & \ldots & A_n \\ q_1 & q_2 & q_3 & \ldots & q_n \\ c_1 & c_2 & c_3 & \ldots & c_n \\ f_1 & f_2 & f_3 & \ldots & f_n \\ r_1 & r_2 & r_3 & \ldots & r_n \\ t_1 & t_2 & t_3 & \ldots & t_n \end{bmatrix} \quad (13)$$

Put another way, processing at 302 includes the calculation of a pro-rata allocation as follows in Formulas (14)-(21):

$$c_j \quad j = 1, n, \quad (14)$$

$$A_j \leftarrow E \times c_j \quad j = \overline{1, n} \quad (15)$$

$$f_j, r_j \quad j = \overline{1, n} \quad (16)$$

$$R \leftarrow \sum_{i=1}^{n} r_j \text{ while } R > 0 \quad (17)$$

$$\begin{cases} (f_j, r_j, t_j) j = \overline{1, n} & (18) \\ k \leftarrow \min_{j=\overline{1,n}} \{t_j \otimes \max_{j=\overline{1,n}} \{r_j \otimes \min_{j=\overline{1,n}} \{f_j\}\}\} & (19) \\ A_k \leftarrow A_k + ls \text{(where } ls \text{ is the lot size} \\ \quad \text{specific to the financial product)} \end{cases}$$

$$f_k, r_k \quad (20)$$

$$R \leftarrow R - ls \quad (21)$$

Where Formula (14) results in a determination of the coefficient, Formula (15) distributes the total executed amount proportionally, Formula (16) determines the percentage the demanded quantity has been satisfied, and Formulas (18)-(20) determine the account that will receive one of the remaining lots based on certain criteria.

At this point, processing of 302 is complete, and a quantity to be allocated to each account has been determined. Processing continues at 304 where an initial distribution is constructed by distributing the executed prices in at least two lists. Put another way, the data is arranged based on a strategy consistent with the objective function. In general, the executed prices are sorted in ascending order of their absolute distance from the overall average as shown in Formula (22):

$$\overline{p}, l_i = |(p_i - \overline{p})|, i = \overline{1, m}. \quad (22)$$

Once the prices are sorted, in some embodiments, two subsets of prices are created: (1) those that are less or equal than the overall average $\overline{p}$, and (2) those that are greater than the average. These subsets are shown by Formula (22):

$$U = (p_k : p_k \leq \overline{p}, 1 \leq k \leq m)$$

$$V = (p_{k'} : p_{k'} > \overline{p}, 1 \leq k' \leq m) \quad (22)$$

The strategy, in some embodiments, is to allocate the closest prices to the overall average to the accounts that have the least demand, while the accounts with a greater demand will have a higher probability to receive prices that will compensate each other. If there are multiple accounts with the same demanded quantity, they will receive one lot size at a time from the same executed price till the corresponding executed quantity is exhausted. The general algorithm is described below algorithm is described below by Formulas (23)-(30):

$$l_i = |(p_i - \overline{p})|, i = \overline{1, m}. \tag{23}$$

$$\overline{p_j^c} \leftarrow \min_{i=\overline{1,m}} \{l_i; e_i > 0\} \tag{24}$$

$$\overline{p_j^n} \leftarrow \min_{\substack{p_k \in U \\ p_k \in V}} \left\{ \frac{(\overline{p_j^c} \times a_j^c) + (p_k \times ls)}{a_j^c + ls} \right\} \tag{25}$$

(where $ls$ is the lot size specific to the financial product, $a_j = \sum_{i=1}^{m} a_{ij}$ is the total allocated quantity in account $A_j$, and $\overline{p_j^n}, \overline{p_j^c}$ are the new and the current average price per account, respectively, $a_{kj}^n \leftarrow a_{kj}^c + ls$ (where $a_{kj}^n$ is the new allocated quantity in account $A_j$ at price $p_k$), (26)

$$j \in \{x: q_j = q_x, 1 \le x \le n\} \tag{27}$$

$a_j^n \leftarrow a_j^c +$ (28)

$ls$ (where $a_j^n$ is the new total allocated quantity in account $A_j$), $$j \in \{x: q_j = q_x, 1 \le x \le n\} \tag{29}$$

$e_k \leftarrow e_k - ls$ (where $e_k$ is the remaining quantity at price $p_k$) (30)

Where Formulas (23)-(27) are reiterated from j←1 to n and result in an initialization of the current local average price for which there is an executed quantity available, and search for the price which provides the least impact on the local average (in both subsets U and V). At this point, processing 304 is complete and a solution for the larger integer allocation problem has been found. This solution is used as an initial base for the optimization of 306.

Processing at 306 includes iteratively improving the distribution to improve the objective function, which is shown as Formulas (31) and (32):

$$O = \min\left\{\sum_{j=1}^{n} |\Delta_j|\right\}, \text{ where } \Delta_j = \frac{\overline{p_j}}{\overline{p}} - 1 \ (j = \overline{1, n}), \tag{31}$$

and $|\Delta_j|$ is the absolute value of $\Delta_j$.

$$D = \begin{bmatrix} & A_1 & A_2 & \ldots & & \ldots & A_n \\ (p_1, e_1) & a_{11} & a_{12} & \ldots & & \ldots & a_{1n} \\ (p_2, e_2) & a_{21} & a_{22} & \ldots & & \ldots & a_{2n} \\ \vdots & \vdots & \vdots & \vdots & & \vdots & \vdots \\ & & & \ldots & fromX \rightarrow toY & \ldots & \\ & & & & \vdots & \vdots & \\ & & & \ldots & toX \leftarrow fromY & \ldots & \\ \vdots & \vdots & \vdots & & \vdots & & \vdots \\ (p_m, e_m) & a_{m1} & a_{m2} & \ldots & & \ldots & a_{mn} \\ \overline{p} & \overline{p_1} & \overline{p_2} & \ldots & & \ldots & \overline{p_n} \\ & \Delta_1 & \Delta_2 & \ldots & & \ldots & \Delta_n \end{bmatrix} \tag{32}$$

The algorithm is to identify a pair of accounts between which one lot size can be swapped, at different prices, so that the value of the objective function drives the searching toward the optimal solution or toward a close vicinity of the optimal, as shown in Formulas (33)-(36) (where Formula (36) is a series of formulas):

$$O_{best} \leftarrow \max\{double\} \tag{33}$$

$$\Delta_j^c = \frac{\overline{p_j}}{\overline{p}} - 1 \ (j = \overline{1, n}) \tag{34}$$

$$O_c \leftarrow \sum_{j=1}^{n} |\Delta_j^c| \tag{35}$$

(the current objective function)

determine{(min Row,min Col),(max Row,max Col)} (36)

if have swap while not optim make the interchange and determine the new deltas $\Delta_j^n (j = \overline{1, n})$ $O_n \leftarrow \sum_{j=1}^{n} |\Delta_j^n|$(the next objective function)

if $O_n \ge O_c$ if $O_c \le O_{best}$ $O_{best} \leftarrow O_c$, clear the objective function history if $(O_n - O_{best}) <$ Annealing Temperature if Annealing Temperature is tuned warm up else tune the Annealing Temperature, and cool down else optim ← true else if $O_n \le O_{best}$ $O_{best} \leftarrow O_n$, clear the objective function history if optim swap back the previously interchanged quantities else $O_c \leftarrow O_n$ append the moves to the Tabu List remove the moves older than the Tabu List length preserve the current objective function data in the history determine{(min Row, min Col), (max Row, max Col)} if have swap warm up else optim ← true if $O_{best} < O_c$ go back in the history to the best found objective function (solution)

Note that at each step the value of the objective function does not need necessarily to be less than at the previous step (that would be a simple Greedy or Steepest Ascent strategy). Using a Simulating Annealing approach, the algorithm allows relaxation, for escaping from the trap of local optimums, and for redirecting the search, within the space of the solutions, toward the global optimum proximity.

However, allowing relaxation opens the possibility of cycling. Introducing a Tabu List, the search acquires a short-term memory, which prevents going back down the paths that have been already explored. In some embodiments, the Tabu List stores a triad of data, including: account FROM, account TO, and price AT.

Pursuant to some embodiments, a procedure of the algorithm is to determine between which accounts, and at what prices a swap can be made at a given point. In some embodiments, a Min-Max strategy is employed. At each iteration we attempt to swap one lot size between the account which has the lowest average price and the account which has highest one (this is the Max part of the strategy). The Min part of the strategy comes in place when the executed prices at which the swap is to be made are selected. That is, the system performs some fine tuning and looks for the pair of prices for which the swap will have the least impact on the average price of the pair of accounts concerned. This is shown in Formula (37):

$$\text{If} \left( \max_{j=1,n} \{\Delta_j\} - \min_{j=1,n} \{\Delta_j\} \right) < \varepsilon (0 < \varepsilon < 1) \quad (37)$$

If Formula (37) is satisfied, then processing stops and the best solution has been found. As with the majority of the heuristic algorithms, the reach of the optimum is not necessarily guaranteed. Nevertheless, Applicant's testing have showed significant and consistent improvements processing at 306 is completed (as compared to the results provided at the end of processing at 304). In this manner, pursuant to some embodiments, a system, method, means and computer program code for determining a pair of accounts between which one lot size has to be swapped, includes operating a Tabu search in the space of solutions, performing a simulated annealing technique in conjunction with the Tabu Search, and combining the two techniques to solve an integer allocation problem.

Processing continues at 308 where the allocation is finalized. For example, processing at 308 may include transmitting an allocation message to a trading system (e.g., such as the system of FIG. 1), or to an entity managing the customer's brokerage accounts so that the allocation can be deployed.

Figure 4:
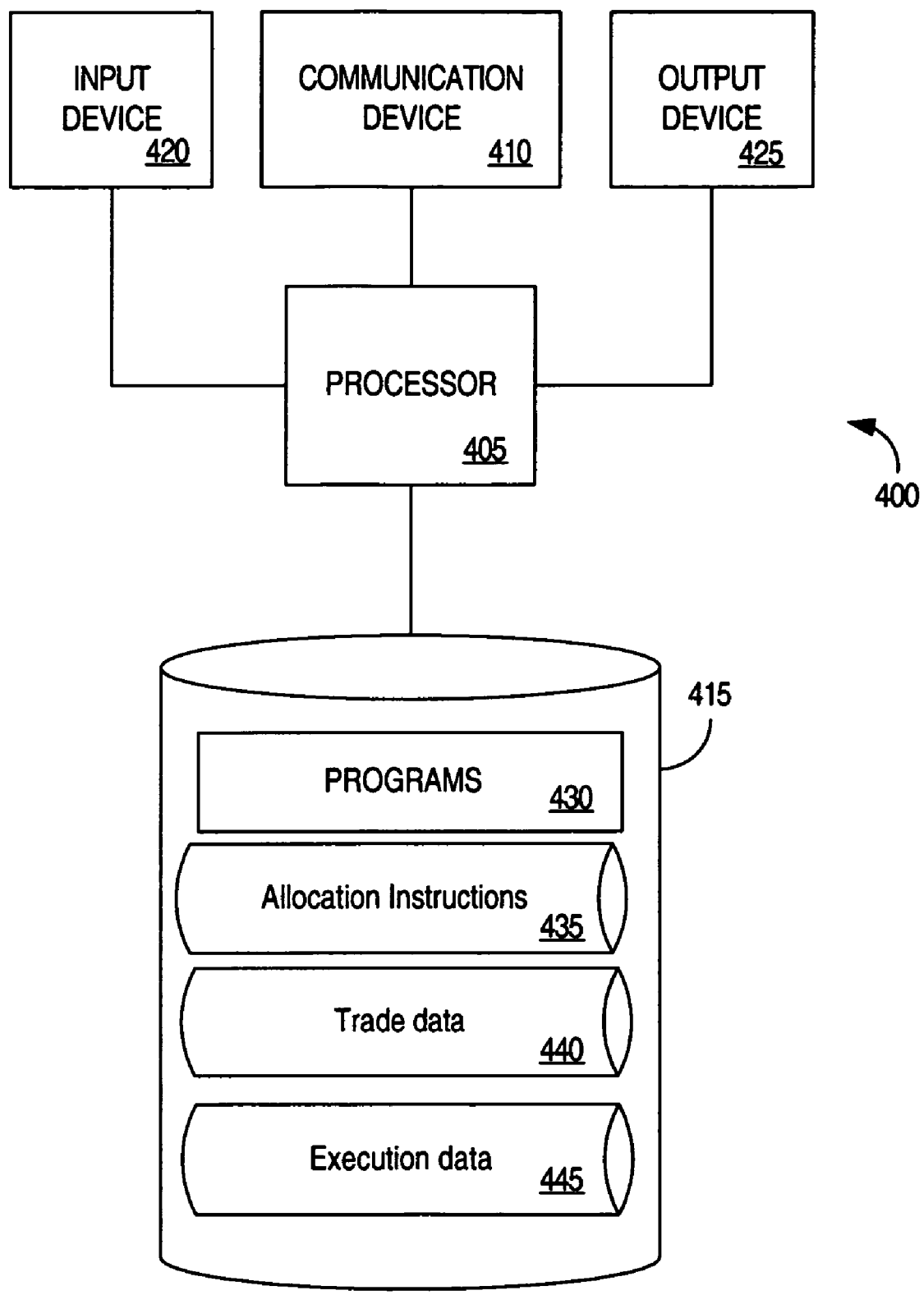
FIG. 4 is block diagram of a portion of a system consistent with some embodiments.

Reference is now made to FIG. 4, where an illustrative allocation system 400 is shown. As described above, the allocation system 400 may be operated in conjunction with, or be a part of, trading system 100 of FIG. 1. As depicted, allocation system 400 includes a computer processor 405 operatively coupled to a communication device 410, a storage device 415, an input device 420 and an output device 425. Communication device 410 may be used to facilitate communication with, for example, other devices (such devices in trading system 100, etc.). Input device 420 may comprise, for example, a keyboard, a keypad, a mouse or other pointing device, a microphone, knob or a switch, an infra-red (IR) port, a docking station, and/or a touch screen. Input device 420 may be used, for example, to enter information (e.g., information regarding routing rules or the like). Output device 425 may comprise, for example, a display (e.g., a display screen), a speaker, and/or a printer.

Storage device 415 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 415 stores one or more programs 430 for controlling processor 405. Processor 405 performs instructions of program 430, and thereby operates in accordance with the present invention. In some embodiments, program 430 may be a rule-based engine that the allocation scheme described above in conjunction with FIG. 3. In some embodiments, program 430 may be configured as a neural-network or other type of program using techniques known to those skilled in the art to achieve the functionality described herein.

Storage device 415 also stores databases, including, for example, a database 435 storing allocation instructions (received from customers), a database 440 storing trade data (including order data received from trading system 100), and a database 445 storing execution data (from trading system 100). The data from these datastores are used in conjunction with the program to perform the processing of FIG. 3. Other databases and configurations may also be provided.

Although the present invention has been described with respect to a preferred embodiment thereof, those skilled in the art will note that various substitutions may be made to those embodiments described herein without departing from the spirit and scope of the present invention.

I claim:

1. A computer implemented method, comprising:
    allocating by a computer a total executed quantity of an order for a product on a plurality of a customer's accounts, said allocating based on a pro-rata basis; and
    constructing an initial solution;
    distributing executed prices according to the initial solution; and
    iteratively improving said initial solution.

2. The method of claim 1, wherein said iteratively improving includes iteratively improving said initial solution by employing Tabu Search in conjunction with Simulated Annealing heuristics.

3. The method of claim 1, wherein said initial solution is performed by distributing the executed prices in at least two lists.

4. The method of claim 1, wherein said allocating further includes determining a pro-rata coefficient for each account.

5. The method of claim 3, wherein the executed prices are sorted in ascending order of their absolute distance from an overall execution price average.

6. The method of claim 5, wherein a first list includes prices that are less than or equal to the overall execution price average and a second list includes prices that are greater than the overall execution price average.

7. The method of claim 6, further comprising distributing the executed prices at least in part based on a demand characteristic associated with each account.

8. The method of claim 2, wherein said iteratively improving includes use of a min-max strategy.

9. An allocation system, comprising:
    a processor; and
    a storage device in communication with said processor and storing instructions adapted to be executed by said processor to:
        allocate a total executed quantity of an order for a product on a plurality of a customer's accounts, said allocation based on a pro-rata basis; and
        constructing an initial solution;

distributing executed prices according to the initial solution; and
iteratively improving said initial solution.

10. An allocation computer system, comprising:
a processor; and
a storage device in communication with said processor and storing instructions adapted to be executed by said processor to:
allocate a total executed quantity on a plurality of customer accounts, said allocation based on a pro-rata basis;
construct an initial solution;
distribute executed prices according to the initial solution; and
iteratively improve said initial solution.

* * * * *